Feb. 8, 1966   A. F. JOHNSON   3,234,008
ALUMINUM PRODUCTION
Filed May 4, 1962
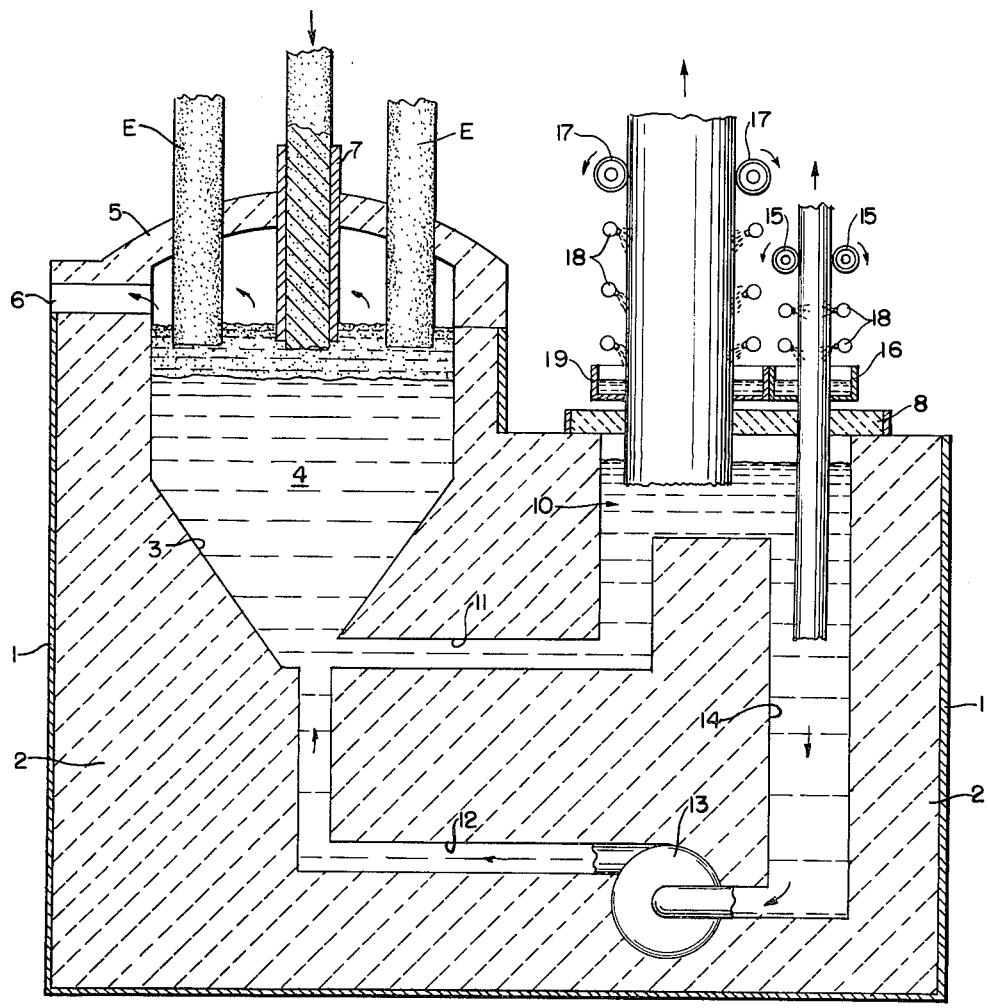
INVENTOR
ARTHUR F. JOHNSON
BY Pennie, Edmonds
Morton, Barrows & Taylor
ATTORNEYS 3,234,008
ALUMINUM PRODUCTION
Arthur F. Johnson, 27th Floor, 235 E. 42nd St.,
New York, N.Y.
Filed May 4, 1962, Ser. No. 192,478
6 Claims. (Cl. 75—10)

This invention relates to the production of aluminum by the electrothermal reduction of aluminous-carbonaceous fusions, and has for its objects the provision of an improved process of dissolving the reduced aluminum in a heavy metal alloy and cooling the heavy metal alloy to recover crystallized commercially pure aluminum and an improved apparatus for carrying out the process.

It has been known for many years at least since the Cowles Patent 324,658 of 1885 that aluminum could be produced by electrothermal reduction. In spite of the very large and efficient electric arc furnaces which have been used in the steel industry, and the large capital investment necessary to produce aluminum in the Hall process, there has been no practical process put to use for the electrothermal reduction of aluminous material such as alumina with carbon, petroleum coke or carbides.

The process of my invention comprises providing in an electric arc furnace a body of aluminum alloy with a metal such as iron or silicon, and an overlying fusion of alumina and carbonaceous reducing agent which is in position to be heated by graphite or carbon electrodes. The alloying metal, namely iron or silicon, is one that will dissolve aluminum in considerable proportions at a high temperature of 1300° C. to 1500° C. and will float the fusion thereover. The iron and silicon have a high boiling point and form alloys with the aluminum having a higher specific gravity than the alumina-carbon fusion which is from 3 to 4. In another important feature of the process, molten metal in which aluminum is solvent is circulated into contact with the aluminum alloy in the reduction furnace. I prefer to use molten lead as the solvent metal because it has several desirable properties for the process of the invention. It is heavier than the aluminum alloy and does not rise in the alloy in the reduction furnace. Lead has appreciable (1%) solubility for aluminum at 1100° C. and a solubility for aluminum of perhaps 2.5% at 1200° C. while at 700° C. (just above the freezing point of aluminum) aluminum only dissolves about 0.20% lead. Another characteristic of lead favoring its use is its vapor pressure of only 1 mm. mercury at 987° C., only 10 mm. at 1167° C. and 400 mm. at 1611° C. An important feature of my invention is that I prefer to cool the recirculated lead to about 350° C. at which temperature it dissolves only about 0.03% aluminum and can be conveniently pumped in a cast iron or steel pump.

Because of these properties the lead is used to dissolve aluminum at a high temperature in the reduction furnace and circulated to a furnace where it is cooled to give up aluminum.

As feed for the reduction process I prefer to use an aluminous-carbonaceous mixture which may contain a physical mixture or chemically reacted mixture of only commercially pure alumina (aluminum oxide, $Al_2O_3$) and commercially pure calcined petroleum coke such as are the principal raw materials of the aluminum industry as it now is practiced while utilizing the conventional Hall process.

My invention provides an improved metallurgical apparatus comprising an electric arc reduction furnace having carbon or graphite electrodes operated on alternating current, means for maintaining a fusion of aluminous-carbonaceous material near and heated by the electrodes, a vessel for maintaining an alloy of a heavy metal beneath the fusion, an aluminum recovery furnace, a duct system connecting the reduction furnace and the recovery furnace, means for circulating the molten lead alloy from the vessel to the recovery furnace, and means to cool the lead alloy in the recovery furnace to crystallize commercially pure aluminum. The duct means is preferably a closed circuit having therein a pump for circulating the molten lead alloy.

These and other novel features of the invention will be better understood after considering the following discussion taken in conjunction with the accompanying drawing illustrating in vertical cross-section an apparatus of the invention.

The apparatus illustrated in the drawing comprises a steel shell 1 enclosing refractory material 2 such as fused alumina or silica. Within the refractory material is a chamber or vessel 3 for confining the molten alloy of aluminum 4. The vessel 4 has a refractory roof 5 such as silica brick and in the roof is a lateral gas outlet port 6 which may have suitable pressure relief valve means. The roof has three holes in which are mounted three graphite electrodes E which are connected to a three-phase alternating current system and electrically insulated from the steel shell of the furnace roof. Any suitable multiples of three electrodes such as six, nine or twelve may be used. The roof has another opening in which is mounted a feed duct 7 formed of fused alumina or graphite for feeding the reduction furnace with aluminous-carbonaceous mixture.

Within the refractory is a vessel 10 for the recovery of aluminum which is closed above with the refractory cover 8. This vessel connects to the vessel 3 by an upper duct 11 and also to the vessel 3 by a lower duct 12 in which is mounted a pump 13 formed of steel or cast iron. The chamber 10 has a depending extension 14 which forms a part of the duct 12. The ducts 11 and 12 form a closed circuit in which vessels 3 and 10 are in contact.

In carrying out a process of the invention a mixture of alumina and petroleum coke is fed into vessel 3 around the electrodes and fused by the electrodes over a molten body of iron or silicon alloy of aluminum. However, following the teaching of Blackmore, I prefer to partially react the alumina and carbon before introducing the two into the reduction furnace of my invention because by so doing some of the oxygen is driven off from the alumina so that there is less oxygen to be driven off in the reduction process. Just what compounds are formed in this preliminary fusion of alumina and carbon in which the initial part of oxygen is driven off is not exactly known. The supposition is that some carbides of aluminum are formed and possibly oxides of aluminum containing less oxygen than $Al_2O_3$. Likewise some amounts of aluminum vapor may be condensed in this aluminous-carbonaceous mixture. The important requirement of my invention is that the overall proportions of $Al_2O_3$ and carbon in the original mixture of alumina and carbon correspond to the following chemical reaction:

$$Al_2O_3 + 3C = 2Al + 3CO$$

Of course, allowance must be made to provide any additional carbon burned by atmospheric air leakage (as by diffusion) into the furnaces. Then in the above described preliminary fusion about half to two-thirds of the oxygen may be driven off as CO and the resulting fused mass (usually allowed to cool below freezing temperature) is introduced into the reduction furnace through feed duct 7 as a granular mixture or as a continuously cast solid rod of aluminous-carbonaceous mixture. The advantage of introducing the aluminous-carbonaceous mixture as a solid is that less dusting occurs in the violent reduction that occurs at 1700° to 2600° C. in the reduction process near the electrodes E with consequent nuisance of dust collection from CO evolved. Of course, the fact that part of the oxygen has been driven off results in the furnace operating in a more efficient manner as taught by Blackmore (in U.S. Patent 675,190) when aluminum carbide is mixed with alumina.

Assuming that the heavy metal aluminum alloy in the vessel 3 is an alloy of aluminum and iron the aluminum reduced from the fusion by the electric arcs is dissolved in this alloy. This alloy can be very materially enriched in aluminum at the high temperatures used which vary from 1800° to 2600° C. in the fusion end near the interface. The ducts 11 and 12 and vessel 10 are filled with molten lead in which varying amounts of aluminum are dissolved. The pump 13 circulates the metal in the direction of the arrows which is downwardly in the duct portion 14 and upwardly into contact with the iron-aluminum alloy 4 in vessel 3.

If the metal at the interface of the lead and alloy 4 is at a temperature from 1100° C. to 1200° C. the aluminum has the capacity of dissolving about 2½% of lead. The lead enriched in aluminum circulates into the recovery vessel 10. In this vessel a cast rod-like ingot of pure aluminum is suspended by the rollers 17 which are provided with gear means for moving the rod upwardly as aluminum is crystallized on the lower end. This rod of aluminum is cooled to a temperature of about 300° C. by water sprayed on the exterior. The excess water is caught in the launder 19 and removed from the furnace. Since this relatively cool rod of aluminum dips into the aluminum-lead alloy it decreases the temperature of the aluminum-lead alloy to from 670–700° C. At this temperature which is just above the freezing point of aluminum, molten aluminum can dissolve only about 0.20% of lead. At this temperature in the vessel 10 pure aluminum and usually containing much less than 0.20% lead crystallizes on the rod and as it increases in length it is moved upwardly.

In an extension of the chamber 10 another rod of aluminum is suspended and is also supported by rollers 15 by means of which the rod is moved upward as it becomes lengthened by crystal deposits on the lower end. This rod is also cooled by water sprays 18 and excess water is removed through the launder 16. As a result of the cooling this rod has temperature varying from 50° C. outside of the furnace to a temperature of about 200° C. at its lower end. It will be accordingly noted that the aluminum-lead alloy surrounding this rod is cooled to a lower temperature than in the remaining part of the vessel 10 and is at a preferred temperature of about 350° C. At this temperature the lead can dissolve only about 0.03% of aluminum. As a result of the action of the pump 13 the alloy rich in lead and low in aluminum is circulated back to the vessel 3 and into contact with the iron-aluminum alloy 4. The iron does not dissolve in the lead but at the temperature of 1100° C. to 1200° C. the lead can dissolve up to 2.5% of aluminum. The process operates continuously as aforementioned.

The pure aluminum recovered may be further reduced in minor impurities such as lead by well known conventional methods of which zone refining is an example.

I claim:

1. The process of producing and recovering aluminum from oxidic aluminum material which comprises providing a fusion of a mixture of the oxidic material and a solid carbonaceous reducing agent, reducing aluminum from the oxidic material by electrothermal reduction, providing beneath the fusion a body of molten heavy metal aluminum alloy which alloy is heavier than the fusion and on which the fusion floats, providing a body of an alloy of lead and aluminum and circulating the lead alloy into contact with the heavy metal aluminum alloy on which the fusion floats, said heavy metal aluminum alloy being sufficiently hot that the lead alloy has the capacity of dissolving a relatively high percentage of aluminum, circulating the lead-aluminum alloy to a place of lower temperature near the melting point of aluminum, crystallizing pure aluminum from the lead-aluminum alloy, and circulating the lead depleted in aluminum back to and into contact with the heavy metal aluminum alloy.

2. In the process of claim 1, mechanically pumping the lead alloy in a closed circuit.

3. In the process of claim 1, casting the pure aluminum in the form of a continuous rod removed from the lead-aluminum alloy at the rate formed, and returning to the heavy metal alloy molten lead aluminum alloy depleted in aluminum.

4. The process of producing and recovering aluminum from oxidic aluminum material which comprises providing a fusion of a mixture of the oxidic material and a solid carbonaceous reducing agent, reducing aluminum from the oxidic material by electrothermal reduction, providing beneath the fusion a body of molten heavy metal aluminum alloy which alloy is heavier than the fusion and on which the fusion floats, circulating molten lead containing some aluminum into contact with the heavy metal aluminum alloy to dissolve aluminum therein, circulating the lead-aluminum alloy to a place at a temperature near the melting point of aluminum and crystallizing out pure aluminum in the form of a continuous casting, cooling the casting to crystallize the aluminum thereon, and returning the molten lead alloy depleted in aluminum to the heavy metal aluminum alloy to dissolve more aluminum for a repetition of the process.

5. In the process of claim 4 maintaining the temperature of the heavy metal aluminum alloy at about 1100° to 1200° C. to dissolve aluminum in the lead-aluminum alloy and the temperature of the lead-aluminum alloy where the aluminum crystallizes at from 670° to 700° C.

6. In the process of claim 5, providing a heavy metal alloy of one of the metals of the group consisting of iron and silicon.

References Cited by the Examiner

UNITED STATES PATENTS

| | | | |
|---|---|---|---|
| 324,659 | 8/1885 | Cowles | 74—68 |
| 491,394 | 2/1893 | Willson | 75—10 |
| 1,833,076 | 11/1931 | Haglund | 75—10 |
| 1,913,929 | 6/1933 | Kerschbaum | 75—10 X |
| 2,198,673 | 4/1940 | Loevenstein | 75—63 |
| 2,363,695 | 11/1944 | Ruppik | 22—200.1 |
| 2,382,723 | 8/1945 | Kirsebom | 75—63 X |
| 2,468,660 | 4/1949 | Gjedebo | 75—63 |
| 2,471,899 | 5/1949 | Regner | 75—63 |
| 2,721,813 | 10/1955 | Holmberg | 75—63 |
| 2,912,321 | 11/1959 | Brennan | 75—63 |
| 2,927,008 | 3/1960 | Shockley | 148—1.6 X |
| 2,962,277 | 11/1960 | Morrill | 22—57.2 X |
| 3,059,038 | 10/1962 | Grunert | 13—9 |
| 3,086,857 | 4/1963 | Pfann | 75—10 |

DAVID L. RECK, *Primary Examiner.*

WINSTON A. DOUGLAS, *Examiner.*